(12) United States Patent　　(10) Patent No.:　　US 8,769,619 B2
　　Carrico et al.　　　　　　　　(45) Date of Patent:　　*Jul. 1, 2014

(54) NETWORK SECURITY DEVICE AND METHOD

(71) Applicant: AT&T Intellectual Propert II, L.P., Atlanta, GA (US)

(72) Inventors: Sandra Lynn Carrico, Mountain View, CA (US); Philippe Hebrais, Menlo Park, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,424

(22) Filed: Dec. 11, 2012

(65) Prior Publication Data

US 2013/0125207 A1　　May 16, 2013

Related U.S. Application Data

(63) Continuation of application No. 12/861,156, filed on Aug. 23, 2010, now Pat. No. 8,356,189, which is a continuation of application No. 12/037,027, filed on Feb. 25, 2008, now Pat. No. 7,783,901, which is a continuation of application No. 10/005,113, filed on Dec. 5, 2001, now Pat. No. 7,346,783.

(51) Int. Cl.
　　*H04L 29/06*　　　　(2006.01)
(52) U.S. Cl.
　　USPC ............................................................ 726/3
(58) Field of Classification Search
　　CPC ...... H04L 63/0272; H04L 63/04; H04L 63/08
　　USPC ............................................................. 726/3
　　See application file for complete search history.

(56) References Cited

U.S. PATENT DOCUMENTS

| 4,811,288 | A | | 3/1989 | Kleijne et al. |
|---|---|---|---|---|
| 5,060,261 | A | | 10/1991 | Avenier et al. |
| 5,159,629 | A | | 10/1992 | Double et al. |
| 5,293,424 | A | * | 3/1994 | Holtey et al. ................. 713/193 |
| 5,469,557 | A | | 11/1995 | Salt et al. |
| 5,491,827 | A | * | 2/1996 | Holtey .......................... 711/163 |
| 5,561,812 | A | | 10/1996 | Ravaux et al. |
| 5,623,637 | A | | 4/1997 | Jones et al. |
| 5,629,981 | A | | 5/1997 | Nerlikar |
| 5,768,382 | A | | 6/1998 | Schneier et al. |
| 5,778,071 | A | | 7/1998 | Caputo et al. |
| 5,826,015 | A | * | 10/1998 | Schmidt ......................... 726/23 |

(Continued)

OTHER PUBLICATIONS

3Com, 10/100 PCI NICs with 3XP Processor, Jul. 2000, 3Com.

(Continued)

*Primary Examiner* — David Garcia Cervetti

(57) ABSTRACT

The invention describes a method for hardening a security mechanism against physical intrusion and substitution attacks. A user establishes a connection between a network peripheral device and a network via a security mechanism. The security mechanism includes read only memory (ROM) that contains code that initiates operation of the mechanism and performs authentication functions. A persistent memory contains configuration information. A volatile memory stores user and device identification information that remains valid only for a given session and is erased thereafter to prevent a future security breach. A tamper-evident enclosure surrounds the memory elements, which if breached, becomes readily apparent to the user.

20 Claims, 1 Drawing Sheet

(56) References Cited

U.S. PATENT DOCUMENTS

| | | | |
|---|---|---|---|
| 5,987,134 A | 11/1999 | Shin et al. | |
| 6,049,885 A * | 4/2000 | Gibson et al. | 713/324 |
| 6,101,608 A * | 8/2000 | Schmidt et al. | 726/2 |
| 6,105,133 A | 8/2000 | Fielder et al. | |
| 6,115,376 A * | 9/2000 | Sherer et al. | 370/389 |
| 6,169,745 B1 | 1/2001 | Liu et al. | |
| 6,185,507 B1 | 2/2001 | Huber et al. | |
| 6,292,898 B1 | 9/2001 | Sutherland | |
| 6,292,899 B1 * | 9/2001 | McBride | 726/22 |
| 6,311,276 B1 * | 10/2001 | Connery et al. | 726/2 |
| 6,351,814 B1 | 2/2002 | Batinic et al. | |
| 6,371,376 B1 * | 4/2002 | Dan | 235/486 |
| 6,401,206 B1 | 6/2002 | Khan et al. | |
| 6,438,429 B1 * | 8/2002 | Ho et al. | 700/22 |
| 6,513,128 B1 * | 1/2003 | Wang et al. | 713/600 |
| 6,546,496 B1 * | 4/2003 | Wang et al. | 713/322 |
| 6,549,960 B1 * | 4/2003 | Allison et al. | 710/29 |
| 6,553,441 B1 * | 4/2003 | Wang et al. | 710/64 |
| 6,556,580 B1 * | 4/2003 | Wang et al. | 370/412 |
| 6,564,333 B1 * | 5/2003 | Ho et al. | 713/340 |
| 6,606,709 B1 * | 8/2003 | Connery et al. | 726/14 |
| 6,609,199 B1 | 8/2003 | DeTreville | |
| 6,622,178 B1 * | 9/2003 | Burke et al. | 710/15 |
| 6,665,306 B1 | 12/2003 | Thakur et al. | |
| 6,721,891 B1 | 4/2004 | Borza | |
| 6,735,627 B2 | 5/2004 | Urien | |
| 6,751,671 B1 | 6/2004 | Urien | |
| 6,760,781 B1 * | 7/2004 | Wang et al. | 709/250 |
| 6,795,923 B1 * | 9/2004 | Stern et al. | 726/12 |
| 6,839,756 B1 | 1/2005 | Boudou et al. | |
| 6,851,052 B1 * | 2/2005 | Graveman | 713/168 |
| 6,862,689 B2 * | 3/2005 | Bergsten et al. | 714/4.5 |
| 6,915,124 B1 | 7/2005 | Kiessling et al. | |
| 6,922,785 B1 * | 7/2005 | Brewer et al. | 713/153 |
| 6,941,377 B1 * | 9/2005 | Diamant et al. | 709/230 |
| 6,944,650 B1 | 9/2005 | Urien | |
| 6,976,167 B2 | 12/2005 | Nenashev | |
| 6,999,948 B1 * | 2/2006 | Hatanaka et al. | 705/65 |
| 7,023,998 B2 * | 4/2006 | Garay et al. | 380/277 |
| 7,100,200 B2 * | 8/2006 | Pope et al. | 726/10 |
| 7,181,629 B1 * | 2/2007 | Hatanaka et al. | 713/194 |
| 7,340,772 B2 * | 3/2008 | Panasyuk et al. | 726/15 |
| 7,370,352 B2 * | 5/2008 | Minnick | 726/11 |
| 7,747,538 B2 * | 6/2010 | Hatanaka et al. | 705/67 |
| 8,356,189 B2 | 1/2013 | Carrico et al. | |
| 2002/0083150 A1 | 6/2002 | Minnick | |
| 2002/0124092 A1 | 9/2002 | Urien | |
| 2002/0138549 A1 | 9/2002 | Urien | |
| 2002/0141589 A1 * | 10/2002 | Garay et al. | 380/277 |
| 2002/0162026 A1 * | 10/2002 | Neuman et al. | 713/201 |
| 2002/0174071 A1 | 11/2002 | Boudou et al. | |
| 2002/0194473 A1 * | 12/2002 | Pope et al. | 713/168 |
| 2003/0046585 A1 * | 3/2003 | Minnick | 713/201 |
| 2003/0051026 A1 * | 3/2003 | Carter et al. | 709/224 |
| 2003/0086542 A1 | 5/2003 | Urien | |
| 2005/0198379 A1 * | 9/2005 | Panasyuk et al. | 709/239 |
| 2006/0116969 A1 * | 6/2006 | Hatanaka et al. | 705/71 |

OTHER PUBLICATIONS

3Com, Etherlink 10/100 PCI Network Interface Card with 3XP Processor User Guide, Aug. 1999, 3Com.

3Com, 3Com Embedded Firewall for the 3CR990 NICs family, Feb. 2002.

Signal, Cyberguardian keeps hackers, insider threats at bay, Jun. 2001.

Payne et al, Architecture and applications for a distributed embedded firewall, 2001, Secure Computing Corporation.

Hartel et al., "Arithmetic Co-processors for Public-key Cryptography: The State of the Art", Sep. 1996.

3Com, 3Com Etherlink and Etherlink Server, 10/100 PCI NICs with 3XP Processor, 2000, <http://www.cyclone.co.nz/Downloads/PDF/3CR990.pdf>.

* cited by examiner

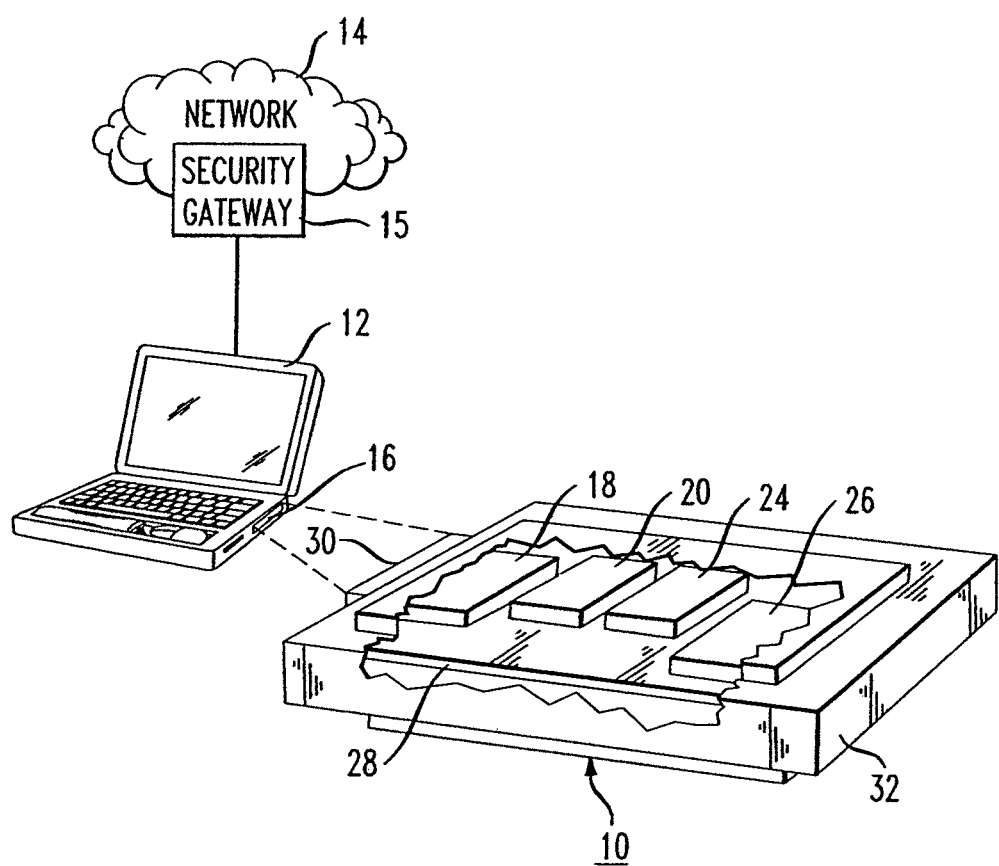

NETWORK SECURITY DEVICE AND METHOD

CROSS REFERENCE TO RELATED APPLICATIONS

This application is a continuation of U.S. patent application Ser. No. 12/861,156, filed on Aug. 23, 2010, now U.S. Pat. No. 8,356,189, which is a continuation of U.S. patent application Ser. No. 12/037,027, filed on Feb. 25, 2008, now U.S. Pat. No. 7,783,901, which is a continuation of U.S. patent application Ser. No. 10/005,113, filed on Dec. 5, 2001, now U.S. Pat. No. 7,346,783, all of which are herein incorporated by reference in their entirety.

TECHNICAL FIELD

This invention relates to a technique for achieving a high level of physical security in a network security device such as would be used with a portable computer, a computer terminal or a Personal Digital Assistant (PDA) to connect to a network and obtain secure service from that network.

BACKGROUND ART

The power of a computing device, such as a personal computer, data terminal or even a Personal Data Assistant (collectively referred hereinafter as "a network peripheral device") improves dramatically when such device is connected to other devices across a network to allow information sharing. Such a network may take the form of a simple Local Area Network (LAN), Wide Area Network, Corporate Intranet, the Intranet or combination of such networks. In many instances, the services, resources and/or data accessed or transmitted through this network are sensitive in that a breach of authenticity or privacy of the services, resources or information would have economic or other undesirable consequences for the users of the network.

Security is achieved by the use of a combination of software and hardware measures. Software employing a variety of cryptographic techniques is used to encrypt and/or authenticate the information exchanged through the network while hardware-based physical security measures guarantee that the cryptographic keys and the software using these keys remain uncorrupted, private and trustworthy. The software and cryptographic techniques used depend on the services, resources and information accessed through the network; for example, a network security device that supports Virtual Private Networking (VPN) functionality will have software that implements IPsec, Point-to-Point Tunneling Protocol (PPTP) or some other VPN protocol. This software will use cryptographic keys in the way specified by the VPN protocol in use to encrypt and/or authenticate all information flowing to and fro the network.

Physical security can be achieved in different ways. Two approaches to physical security are common: physical access control and tamper-proofing. In the first approach, no specific physical security measures are included in the device; the physical security depends entirely on the fact that only authorized and trustworthy users have physical access to the device. In the second approach, the casing of the device is hardened to make its penetration difficult and detectors are placed inside the device to detect any attempt to break through the casing; if a penetration attempt is detected, the device erases all sensitive information from its memory and renders itself useless. The level of security afforded by the first approach depends on the inaccessibility of the device and is limited by the fact that there will be no way to detect a compromise of the device if the physical access controls fail. In most settings the second approach affords a much higher level of security. However, tamper-proofing by itself is not enough to guard against substitution attacks. In a substitution attack, the attacker replaces the security device of the user by another similar device that was prepared specifically so that it uses keys known to the attacker, thereby nullifying the security provided by the device for the user. Tamper-proofing a device is also expensive: the device has to be augmented to include intrusion detectors, circuitry that continuously monitors the detectors and some power source to keep the intrusion detection system active when the device is not in use.

Thus, a need exists for a physical security mechanism that guarantees the integrity of software and keys used by the device and that protects against substitution attacks while keeping the cost of the security measures low.

BRIEF SUMMARY OF THE INVENTION

Briefly, in accordance with a preferred embodiment, the present invention provides a combination of physical security mechanisms and restrictions on the software placed in the device that together provide a high level of security, protecting the device's user (or users) against tampering of the device and against substitution attacks. Because of the restrictions on the software, not all network security devices can benefit from this invention; only those whose software can be modified to fit the imposed restrictions. In practice this does not restrict the types of services that can be offered by the device, only the specific cryptographic protocols that can be used to secure these services. For example, a VPN card implementing PPTP cannot make use of this invention because PPTP does not have the 'perfect forward secrecy' property. On the other hand, a VPN card implementing IPsec can. The security mechanism of the invention includes at least one immutable memory element (e.g., a read-only memory element) that contains information that remains immutable (unchanged) prior to and after each session (except for any upgrades). In practice, the immutable memory element contains security application code that "boot straps" (initiates the operation of) the security mechanism itself as well as initiating execution of application code that provides the security services (i.e., user and security mechanism authentication). The security mechanism also includes a persistent memory element that contains files that may undergo a change between sessions. For example, the persistent memory element may contain configuration information that permits the user to gain network access in different environments. Lastly, the security mechanism includes a volatile memory element for retaining data for only the length of a current session. For example, the volatile memory element typically contains critical security data (e.g., a user password or session specific cryptographic keys) to permit connection to the network as well as provide authentication data that authenticates the user and the security mechanism itself. At the end of the session, all of the information in the volatile memory element is erased, thereby preventing re-use of such information by unauthorized users. A tamper-evident enclosure contains the memory elements. The tamper-evident enclosure, when tampered with, will reflect such tampering, thereby allowing the user to know if an attempt was made to physically compromise the security mechanism.

The security mechanism of the invention affords a high level of security if the software of the device can be made to meet the requirements for 'perfect forward security' and if the device obtains all security critical data from its user at the beginning of each session. In the context of this invention, we define perfect forward security as the property of software whereby a future compromise of the device will not compromise past or present sessions protected by that device. At the beginning of a session, the security mechanism executes a 'key exchange' with the remote gateway. In this exchange, a session key is generated at random, encrypted using the device's private key and sent to the gateway. An attacker who intercepts this encrypted message and later gets access to the device could extract the device's private key and use that to decrypt the session key. In this manner, the attacker breaks the security of a past session. Perfect forward secrecy refers to esoteric cryptographic techniques that render this type of attack impossible. This definition is an extension of the concept of 'perfect forward secrecy' that is a property of cryptographic key exchange protocols that has been much discussed in the cryptographic research community. A consequence of the perfect forward security requirement for the device's software is that any key exchange protocol it uses must have the perfect forward secrecy property. As discussed, the volatile memory that holds the authentication information for the current session is erased at the end of a current session, preventing its re-use. Thus, if someone were to misappropriate the security mechanism, no authentication information remains to allow for unauthorized network entry and no information remains that could be used to decrypt a past session. Moreover, since a tamper-evident enclosure surrounds the various memory elements of the security mechanism, any attempt to physically gain access would become apparent to the legitimate holder of the security mechanism. The security critical data that the device obtains from the user at the beginning of a session must be sufficient to unambiguously determine the security services expected by the user.

The perfect forward security requirement guarantees that a compromise of the device will not compromise the security of past sessions. The tamper-evident properties of the enclosure guarantee that the user will not entrust sensitive information to a device that was compromised. Finally, the requirement that the device collects security critical data at the beginning of each session guarantees that an uncompromised device will provide the expected security services thereby guarding against substitution attacks.

BRIEF DESCRIPTION OF THE DRAWING

FIG. 1 illustrates partially cut-away perspective view of a security device in accordance with a preferred embodiment of the present invention;

DETAILED DESCRIPTION

FIG. 1 illustrates a security mechanism 10 in accordance with a preferred embodiment of the invention for permitting a user (not shown) to establish a secure communications session between a network peripheral device 12 and a communications network 14 via a security gateway 15. The network peripheral device 12 can take the form of a computer terminal, personal computer or a Personal Data Assistant (PDA), while the network 14 may comprise Virtual Private Network (VPN) accessed directly, or through an intermediate network (not shown). In the illustrated embodiment, the security mechanism 10 is a network card that provides VPN functionality and that has the configuration of a Personal Computer Memory Card International Association (PCMCIA) package for receipt in a PCMCIA slot 16 within the network peripheral device 12. Alternatively, the security mechanism 10 could take on other configurations and could offer different functionality without departing from the spirit and scope of the invention.

To facilitate the establishment of a secure session, the security mechanism 10 includes at least one immutable memory element 18 in the form of a Read Only Memory (ROM) element that stores information (software and support files) that remains fixed for all times (i.e., for each and every communications session). In the illustrated embodiment, the memory element 18 bears the designation "Security ROM" because it stores security application software (including bootstrap) code that initiates the operation of the security mechanism 10. Further, the security ROM 18 also generates at random the private key(s) required by the security mechanism 10 to perform its security functions including user and device authentication. (This ensures that the private keys used by different network peripheral devices remain independent from each other and that the security device cannot be forced to use keys known to an attacker.)

As an adjunct to Security ROM 18, the security mechanism 10 may also include a write-once ROM 20 for storing information written into the ROM during manufacture of the security mechanism. Such information may include additional bootstrap code as well as any upgrade that occurred subsequent to the manufacture of the Security ROM 18. (To the extent that either of the ROMs 18 and 20 have an upgrade capability, only the upgrade management software should have the capability of modifying the software in each ROM. Further, any application that loads either ROM should be signed by the manufacturer and the signature verified prior to writing any data.)

In addition to the security ROM 18 (and the write-once ROM 20 if present), the security mechanism 10 of FIG. 1 also includes at least one "persistent" memory element 24, in the form of a Complementary Metal Oxide Semiconductor Random Access Memory (CMOSRAM) or a Programmable Read Only Memory (PROM) for receiving data prior to or during a communications session and for retaining such data for use during a subsequent session. In FIG. 1, the memory element 24 bears the designation "Configuration Memory" because this memory element stores configuration data that enables the security mechanism 10 to facilitate a connection with different networks. Thus, the contents of the Configuration memory element 24 can change upon an application executed by the network peripheral 12 that requires new or updated configuration information. To maintain security, only the application requiring new or updated configuration information should have the ability to write data to the configuration memory element 24 and the data written to this area must not be of a nature that could compromise the security afforded to the user. In other words, security critical data (i.e., data identifying the user and the device) must be excluded. The application executed by the network peripheral device 12 that seeks to write data to the Configuration Memory Element 24 should require signing and that such signing should be verified by the information in the Security ROM 18.

In addition to the previously described memory elements, the security mechanism 10 also includes at least one volatile memory element 26 in the form of a Random Access (RAM) memory or the like. The RAM 26 holds session-specific data, including user-entered verification data, such as a password or Personal Identification Number (PIN), as well as authentication data generated by the security mechanism 10 itself. The data held within the RAM 26 remains only for the duration of a session. At the end of each session, as well as upon a power-down condition, the bootstrap code within the Security ROM 18 (or the bootstrap code in the Write-Once ROM 20) causes the RAM 26 to erase all of its data (or at least its sensitive security data) if such data has not already been erased. In this way, the memory element 26 loses all user-entered verification data, as well as all security mechanism-generated authentication data associated with a given session upon its completion, or upon a power-down condition.

An interconnection medium 28 in the form of a circuit board or the like, supports and interconnects the Security ROM 18, the Write-once ROM 20, the Configuration 24 memory and the volatile memory 26, as well as other chips (not shown) such as a central processing unit. The circuit board 28 couples the memory elements and other components mounted thereon to a connector 30, which mates with a complementary connector (not shown) in the PCMCIA slot 16 of the network peripheral device 12. A tamper-evident enclosure 32 surrounds the circuit board 28 and the components mounted thereon to prevent access to such components, thus preventing tampering therewith. The effective level of the physical security of the security mechanism 10 depends the selection of the materials and fabrication technology employed. In addition to preventing access to the components on the circuit board 28, the tamper-evident enclosure 32 has the property that it readily exhibits any attempt to gain access there through to the circuit board and the components mounted thereon. In this way, a user who inspects the tamper-evident enclosure 32 can easily observe whether anyone has attempted to gain access to any of the Security ROM 18, the Write-once ROM 20, the Configuration 24 memory and the volatile memory 26, thereby compromising the integrity of the security mechanism 10. In addition to employing the tamper-evident enclosure 32, the components of the security mechanism 10 are strengthened against extreme environmental conditions, including, but not limited to under/over voltage conditions, fast/slow clock speeds, temperature variations and electromagnetic radiation.

In the illustrated preferred embodiment, the network security mechanism 10 implements VPN functionality using IPsec. At the beginning of each network connection session, the security mechanism 10 will obtain from the user the security critical data that describes the security services to be provided. This data should specify which security gateway to connect to, which cryptographic algorithms and which key sizes are acceptable, the username by which the user is known to the security gateway and the password that the security gateway will use to authenticate the user. Using this security critical data, the security mechanism 10 establishes a secure connection to the indicated gateway, establishing encryption and authentication keys to be used for the remainder of the session as well as performing any authentication steps that are required by the security gateway to gain access to the resources it controls. The specifics of authentication and key establishment depend on the specific protocols in use. The details for the IPsec VPN protocol, for example, can be obtained from the definition of the protocol itself.

The above-described embodiments merely illustrate the principles of the invention. Those skilled in the art may make various modifications and changes that will embody the principles of the invention and fall within the spirit and scope thereof.

The invention claimed is:

1. A peripheral device for enabling a user to commence a session with a network, comprising:
a security device comprising:
an immutable memory element that comprises first information including an application software for initiating a security operation;
a persistent memory element that comprises second information for enabling the security device to configure the peripheral device to access a different network; and
a volatile memory element that comprises third information, including data for authentication, where the third information is to be erased from the volatile memory at a completion of a connection session.

2. The peripheral device of claim 1, wherein the security operation comprises an authentication of the security device upon a receipt of identification information from the security device.

3. The peripheral device of claim 1, wherein the security operation comprises an authentication of the user to the network upon a receipt of identification information from the user.

4. The peripheral device of claim 1, wherein the immutable memory comprises a private key for encrypting user identification information.

5. The peripheral device of claim 1, wherein the immutable memory comprises a private key for encrypting security device identification information.

6. The peripheral device of claim 1, wherein the immutable memory comprises a read-only memory.

7. The peripheral device of claim 1, wherein the immutable memory comprises a write-once read-only memory.

8. The peripheral device of claim 1, wherein the persistent memory comprises a complementary metal oxide semiconductor random access memory.

9. The peripheral device of claim 1, wherein the persistent memory comprises a programmable read only memory.

10. The peripheral device of claim 1, wherein the volatile memory comprises a random access memory.

11. The peripheral device of claim 1, wherein the peripheral device comprises a computer terminal.

12. The peripheral device of claim 1, wherein the peripheral device comprises a personal computer.

13. The peripheral device of claim 1, wherein the peripheral device comprises a personal data assistant.

14. The peripheral device of claim 1, wherein the network comprises a virtual private network.

15. The peripheral device of claim 1, wherein the third information comprises a user password.

16. The peripheral device of claim 1, wherein the third information comprises a session specific cryptographic key.

17. The peripheral device of claim 1, wherein the security device comprises a network card that is coupled to the peripheral device.

18. A method for facilitating a connection session between a network peripheral device and a network, comprising:
accessing, by a processor, an immutable memory element within a security device that comprises first information including an application software for initiating a security operation;
accessing, by the processor, a persistent memory element within the security device that comprises second information for enabling the security device to configure the peripheral device to access a different network;
accessing, by the processor, a volatile memory element within the security device that comprises third information, including data for authentication; and
erasing, by the processor, the third information at a completion of a connection session.

19. The method of claim 18, wherein the security operation comprises an authentication of the security device upon a receipt of identification information from the security device.

20. The method of claim 18, wherein the security operation comprises an authentication of the user to the network upon a receipt of identification information from the user.

\* \* \* \* \*